United States Patent [19]

Blanco et al.

[11] 4,192,053

[45] Mar. 11, 1980

[54] METHOD FOR RETUBING A STEAM GENERATOR

[75] Inventors: Rodney A. Blanco; Anthony A. Massaro, Jr., both of Export, Pa.

[73] Assignee: Westinghouse Electric Corp., Pittsburgh, Pa.

[21] Appl. No.: 834,855

[22] Filed: Sep. 19, 1977

[51] Int. Cl.[2] .......................... B23P 15/26; B23P 7/00
[52] U.S. Cl. ............................ 29/157.4; 29/157.3 C; 29/402.08; 29/426.2; 165/76
[58] Field of Search ............ 29/157.4, 157.3 C, 401 F, 29/401 R, 427, 426, 455 R; 165/76

[56] References Cited

U.S. PATENT DOCUMENTS

| | | | |
|---|---|---|---|
| 2,176,475 | 10/1939 | Taddiken | 165/76 |
| 2,391,876 | 1/1946 | Brown | 165/76 |
| 2,411,246 | 11/1946 | Clapper | 29/157.4 |
| 2,557,356 | 6/1951 | Little | 165/76 |
| 2,672,849 | 3/1954 | Fruit | 122/333 |
| 2,691,508 | 10/1954 | Hatfield | 165/76 |
| 3,640,339 | 2/1972 | Pacault et al. | 165/76 |
| 3,807,024 | 4/1974 | Harvey et al. | 29/157.4 |
| 3,848,371 | 11/1974 | Dillinger | 29/401 |
| 3,896,873 | 7/1975 | Wolowodiuk et al. | 165/76 |
| 3,976,816 | 9/1976 | Green | 29/157.3 C |
| 4,004,698 | 1/1977 | Gebelin | 165/76 |

FOREIGN PATENT DOCUMENTS

40-18038  12/1965  Japan ............................ 29/157.3 C

Primary Examiner—C. W. Lanham
Assistant Examiner—Daniel C. Crane
Attorney, Agent, or Firm—F. J. Baehr, Jr.

[57] ABSTRACT

A system and method for retubing a steam generator for a pressurized water reactor while the steam generator is in place in a containment vessel.

10 Claims, 13 Drawing Figures

METHOD FOR RETUBING A STEAM GENERATOR

BACKGROUND OF THE INVENTION

This invention relates to steam generators for a pressurized water reactor and more particularly to a system and method for retubing the steam generator while the steam generator is disposed vertically in a containment vessel.

Pressurized water nuclear reactors utilize steam generators to transfer heat from a primary reactor coolant to a secondary fluid, which is vaporized forming steam that drives a steam turbine. Condenser leaks have caused circulating water, which is often brackish, to mix with the secondary fluid and enter the steam generator, resulting in the buildup of undesirable chemicals in the steam generator. Water treatment and blowdown have not completely protected the steam generator from corrosion, resulting in leaking tubes. As the number of leaking tubes increases the desirability of replacing a steam generator increases; however, the steam generators are located in a reinforced concrete vessel, a containment vessel, and removal of the steam generator requires tearing out a large portion of the reinforced concrete walls of the containment vessel. This is time consuming and expensive, therefore it is desirable to retube the steam generator in place within the containment vessel.

SUMMARY OF THE INVENTION

In general, a method for retubing a steam generator having a shell, a tube sheet, which has a plurality of holes and is disposed in the shell, a plurality of tubes extending upwardly from the holes in the tube sheet to form a tube bundle in the shell, a wrapper disposed between the shell and the tube bundle, the upper end of the wrapper being closed by a domed portion and a plurality of pads fastened to the wrapper to space the from the shell, when performed in accordance with this invention, comprises the steps of cutting at least one large opening in the shell adjacent and above the tube sheet, cutting the upper portion of the shell from the lower portion and removing the former. The method also comprises the steps of severing the tubes above the tube sheet, cutting the dome from the wrapper and removing the dome, and cutting the pads disposed between the wrapper and the shell. The method also includes providing a radiation shield, which will accept the tube bundle and wrapper, lifting the tube bundle and wrapper into the radiation shield, removing the radiation shield, tube bundle and wrapper from the shell, installing a wrapper and new tubes, replacing the dome of the wrapper, and replacing the upper portion of the shell, whereby the steam generator is generally in an as good as new condition.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
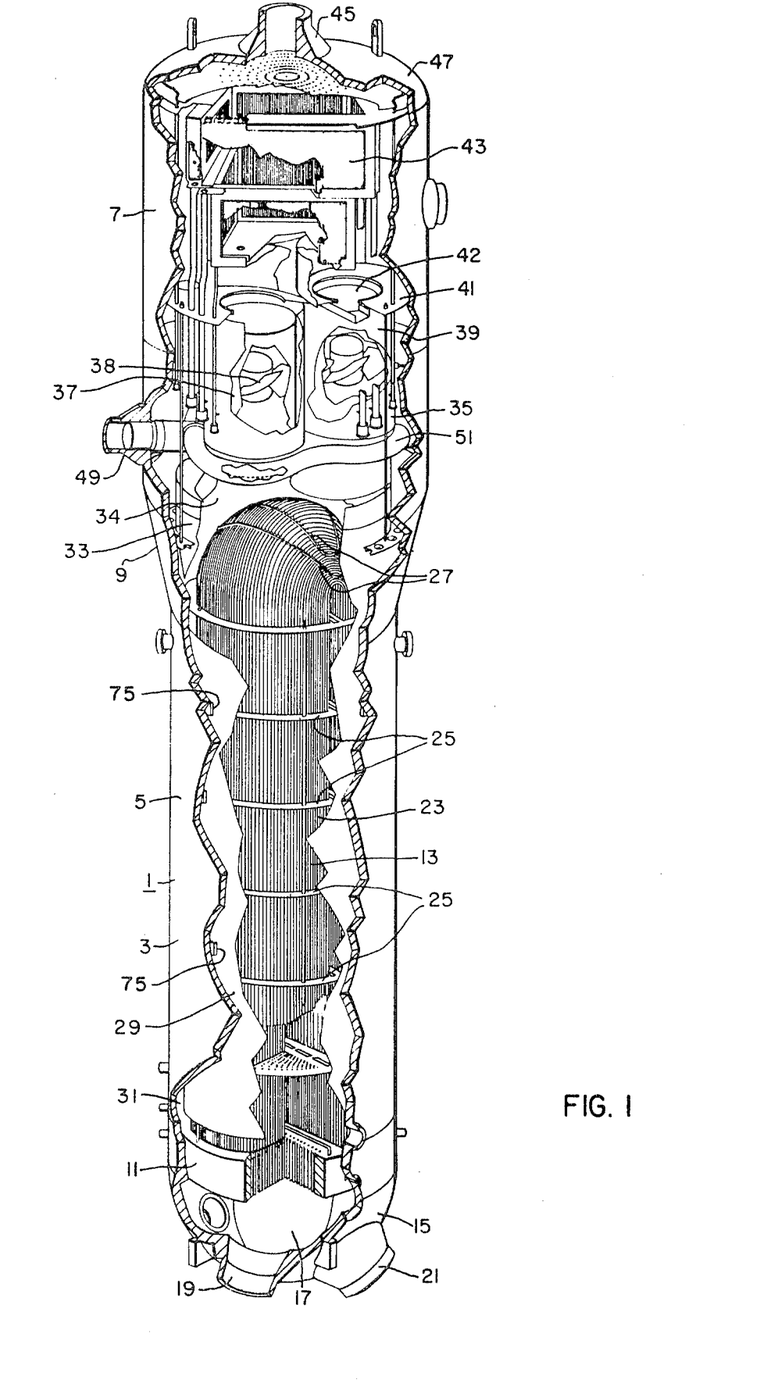
FIG. 1 is a perspective view of a steam generator partially in section.

Referring now to the drawings in detail, and in particular to FIG. 1, there is shown a steam generator 1 having a vertically oriented shell 3, the shell 3 comprising a lower cylindrical portion 5 and an upper cylindrical portion 7, larger in diameter than the lower portion 5, and a frustoconical transition portion 9 joining the upper and lower portions 7 and 5, respectively. A tube sheet 11 is disposed on the lower end of the lower portion 5 of the shell and has a plurality of holes for receiving ends of U-shaped tubes 13 which extend upwardly from the tube sheet 11.

A hemispherical channel head 15 is fastened to the tube sheet 11 and has a splitter sheet or dividing plate 17 disposed therein. A primary fluid inlet nozzle 19 supplies effluent primary fluid to one portion of the channel head 15 and a discharge nozzle 21 is disposed in the channel head 15 to return the effluent primary fluid to a reactor (not shown).

The U-shaped tubes 13 are closely packed, forming a tube bundle 23, which is disposed vertically within the lower portion 5 of the shell 3. A plurality of support plates 25 are disposed throughout the tube bundle 23 to support the tubes 13 at various locations along their length to reduce flow induced vibrations. Anti-vibrations bars 27 are also disposed adjacent the bends in the tubes 13 to prevent vibration in this portion of the tube bundle 23.

A wrapper or sleeve 29 is disposed between the tube bundle 23 and the shell 3 so as to form an annular space 31 therebetween. The upper end of the wrapper 29 is enclosed by a domed cap 33, which has a plurality of openings 34 disposed therein in fluid communication with centrifugal moisture separators 35. The centrifugal moisture separators 35 are made up of two portions, a lower portion 37 formed from a cylindrical member encircling a plurality of swirl vanes 38 and an upper sleeve portion 39 that is fastened to an orifice plate 41, which has orifices 42 that register with the sleeve portions 39 to permit steam that has centrifugally shed some of its entrained moisture to enter the upper portion of the steam generator 1.

A second stage moisture separator 43 is disposed in the upper portion of the steam generator 1 for removing the remaining moisture from the steam before it enters a steam outlet nozzle 45 centrally disposed in an upper dished head 47, which encloses the upper end of the steam generator.

A feedwater inlet nozzle 49 and feedwater distribution ring 51 are disposed in the lower end of the enlarged portion or upper portion 7 of the steam generator 1 adjacent the transition member 9.

A system and/or method for retubing the steam generator 1, while it is vertically oriented in a containment vessel (not shown), comprises removing insulation from the outer side of the shell 3, particularly removing the insulation from the area just above the transition member 9 and feedwater inlet nozzle 49.

Depending on such things as the headroom in the containment vessel, the length of the tubes 13 and the way in which the tubes 13 are to be removed and replaced, a determination is made regarding the elevation at which the steam generator shell 3 is to be parted or cut. Parting or cutting of the shell is accomplished by making a circumferential cut at as high an elevation on the shell 3 as possible. The cut is preferably made by grinding; however, other well known steel cutting techniques such as oxygen-acetylene, air arc, plasma burning or other cutting means may be utilized. To facilitate rewelding the upper portion 7 of the shell to the lower portion 5, when retubing is complete, a circumferential track 53 and automatic drive means 55 are recommended to ensure a uniform cut at the proper angle for rewelding. Therefore, it is preferred that the parting be done by grinding as this cutting process produces the most precise cut. The track 53 and drive means 55 may also be utilized to form the closure weld on the shell 3 after retubing is complete.

Clips (not shown) are installed bridging the cut to maintain the relative position of the upper and lower portion of the shell during the cutting and rewelding operation to assure uniformity in the cut and weld.

Figure 11:
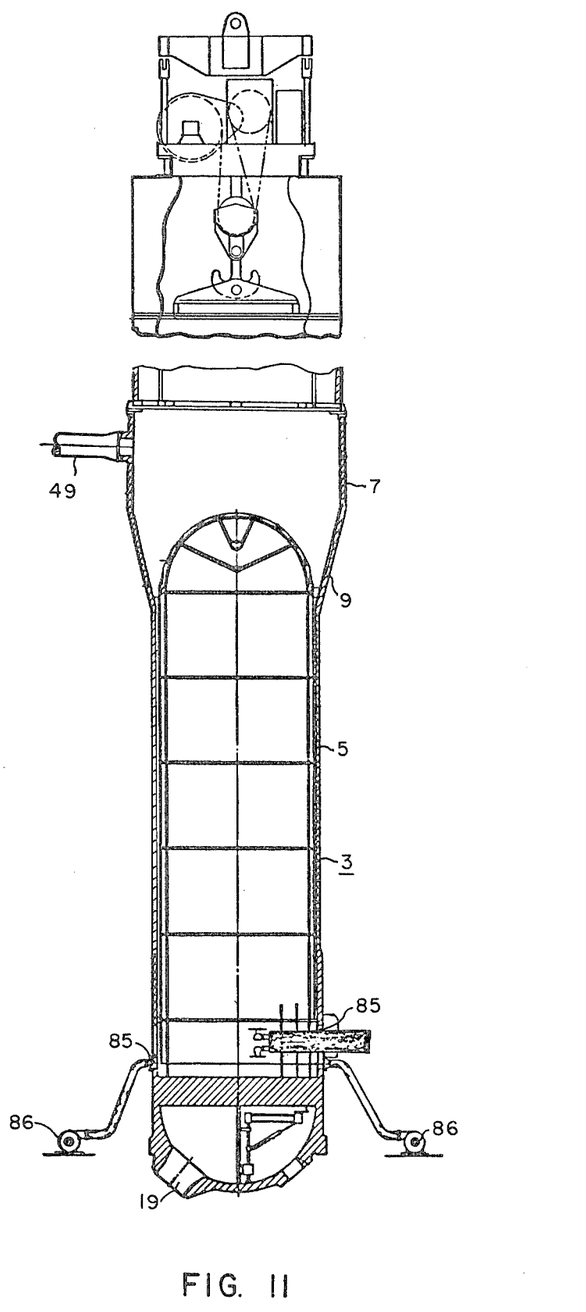
FIG. 11 is a sectional view of the lower portion of the steam generator showing the modified top closure and openings in the shell and wrapper for cutting the tubes free from the tube sheet.
Figure 12:
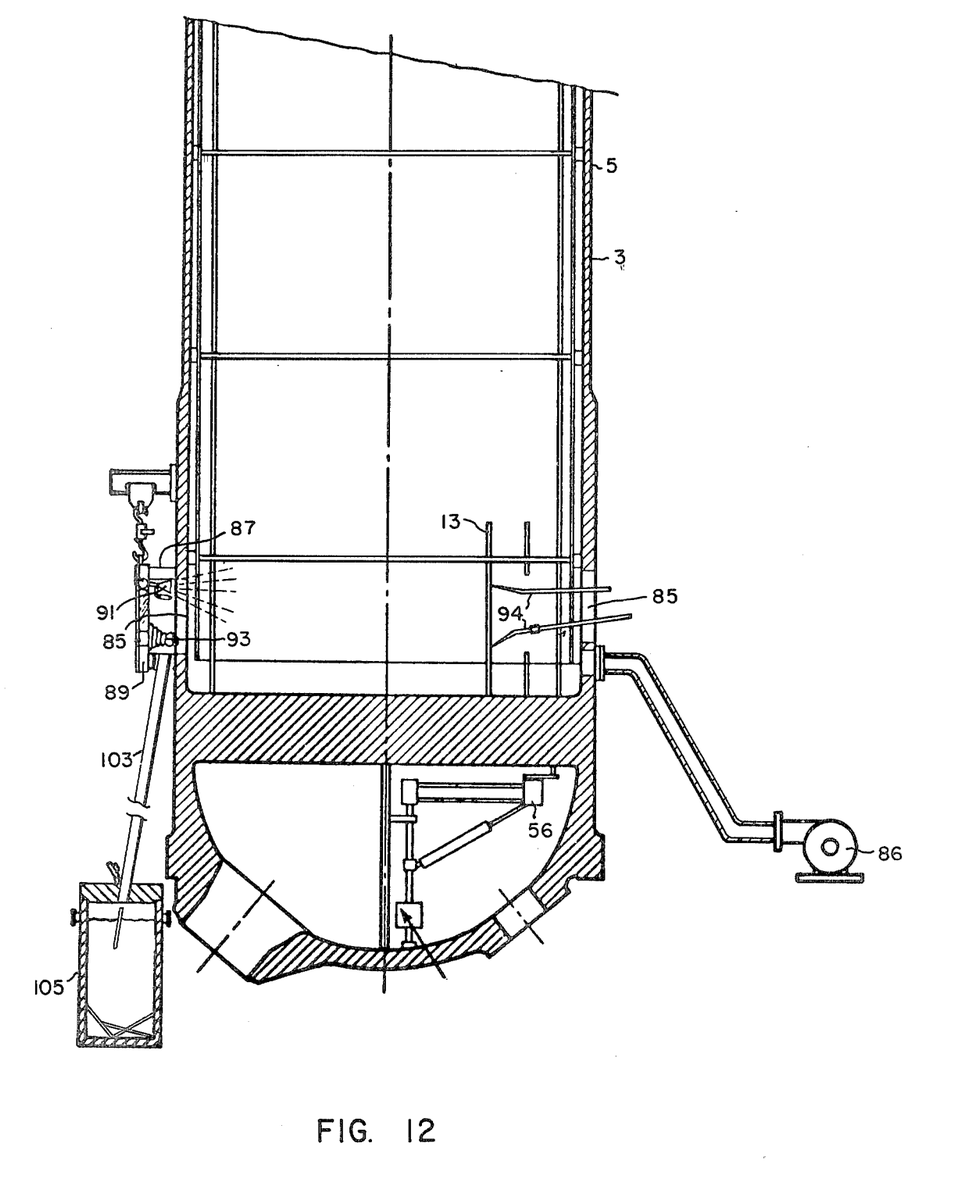
FIG. 12 is a partial sectional view of the steam generator showing openings in the shell adjacent the tube sheet, torches for cutting the tubes free from the tube sheet and a tool for removing the tube-to-tube sheet welds.
Figure 13:
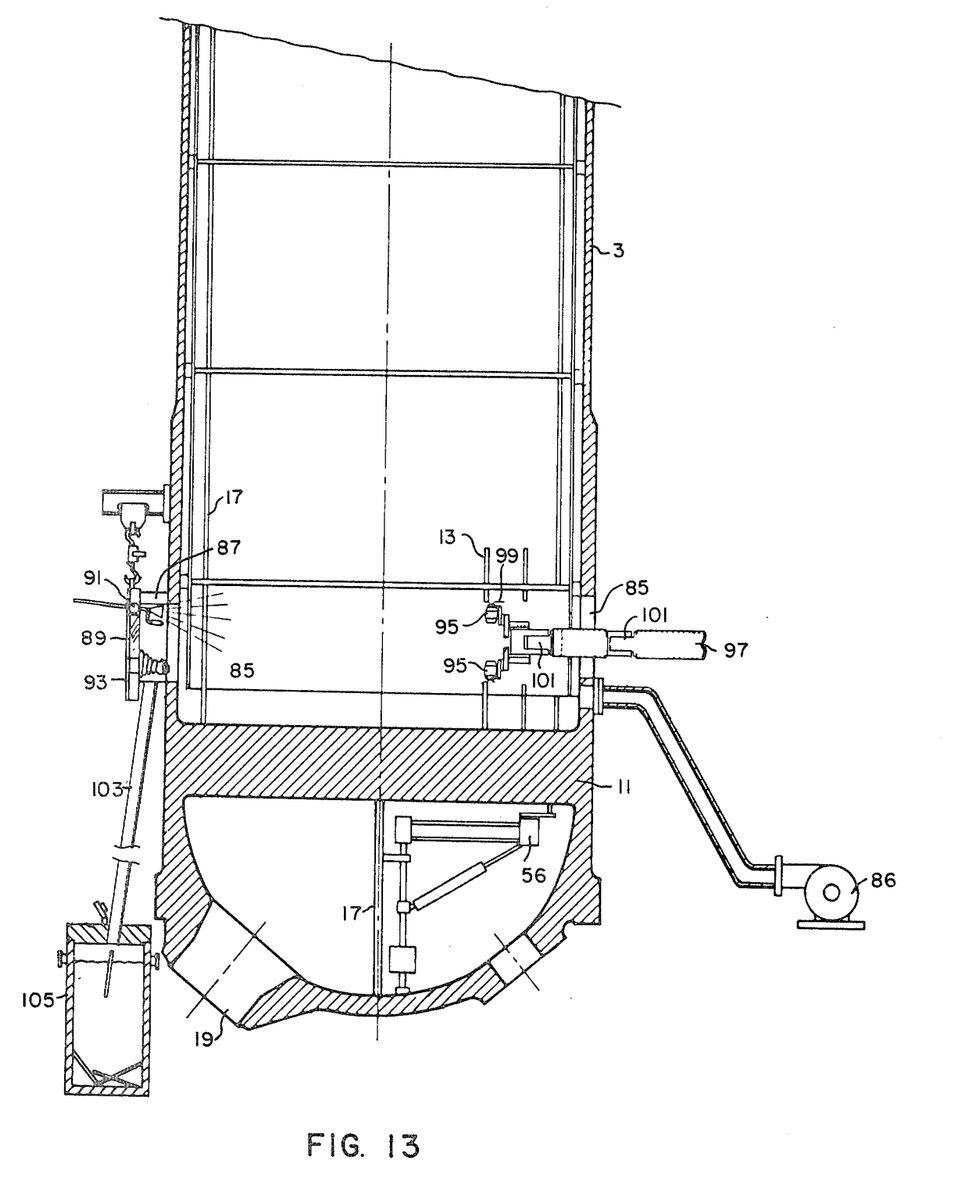
FIG. 13 is a partial sectional view of the lower end of the steam generator showing openings in the shell adjacent the tube sheet and an abrasive cutting tool utilized to cut tubes free from the tube sheet.

During the period of preparation for parting the steam generator and also during the parting operation, other operations may be performed simultaneously. The steam outlet pipe is cut from the steam outlet nozzle 45, manways 46 are removed and work within the steam generator begins. The channel head 15 may be decontaminated. The seal weld between the tubes 13 and the tube sheet 11 are also removed by grinding or cutting means, which cuts away the area of the weld between the tubes 13 and tube sheet 11. Even though the head 15 may be decontaminated, the level of radioactivity in the head 15 may still be high due to radioactive deposits within the tubes so that a grinding or cutting tool 56, which can be remotely operated, as shown in FIGS. 11, 12 and 13 and described in a patent application fluid Mar. 8, 1977 and assigned Ser. No. 775,676, is preferred.

Figures 2, 3:
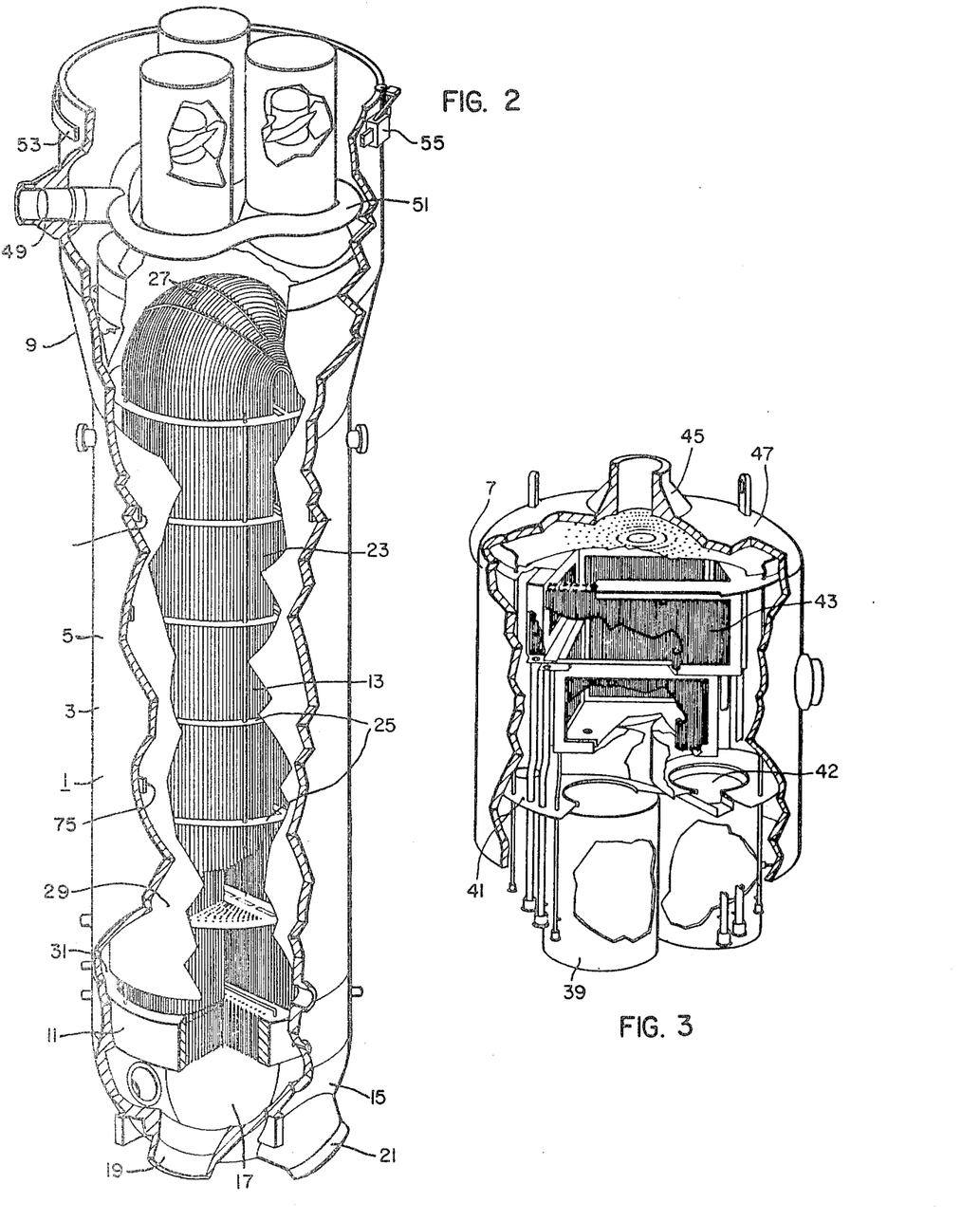
FIG. 2 is a perspective view of the lower portion of the steam generator.
FIG. 3 is a perspective view of the upper portion of the steam generator.

Once the shell 3 is parted, as shown in FIGS. 2 and 3, the upper portion 7 of the shell 3 is removed together with the second stage of the moisture separator 43, the orifice plate 41 and sleeves 39, which are attached to the upper portion 7 of the shell 3 and are removed therewith.

Figure 4:
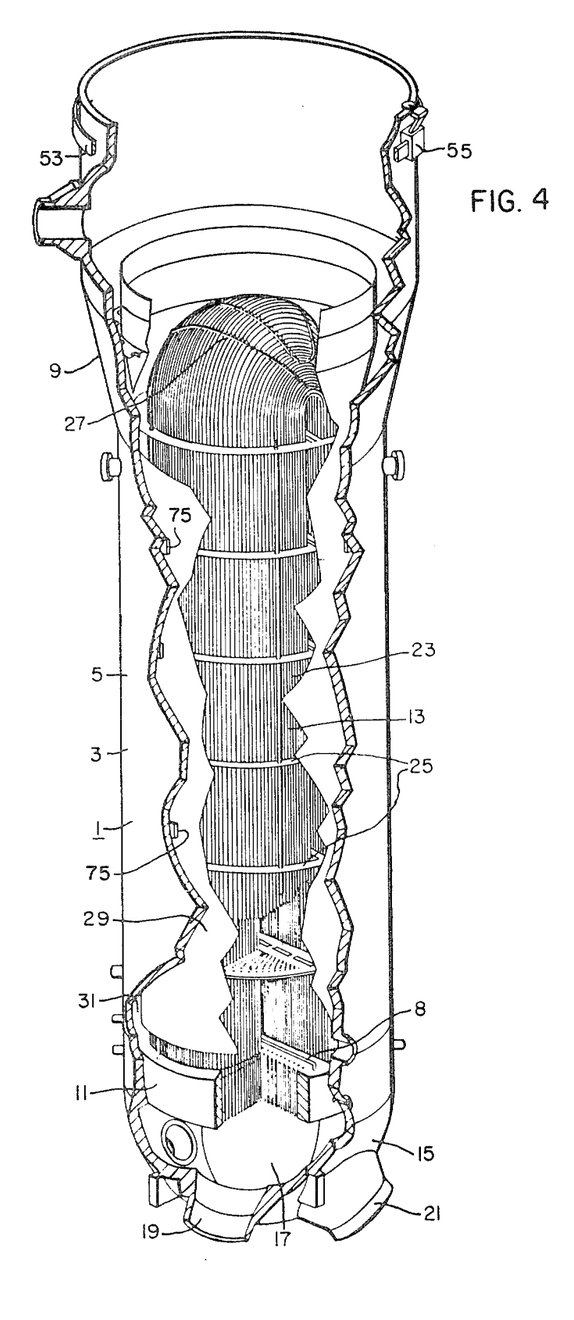
FIG. 4 is a perspective view of the lower portion of a steam generator with additional parts removed.
Figure 5:
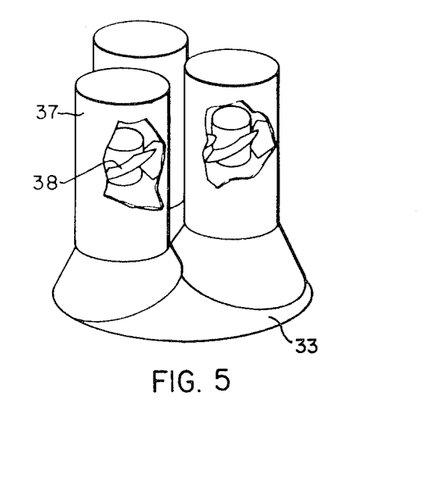
FIG. 5 is a perspective view of a portion of the moisture separator removal apparatus.
Figure 6:
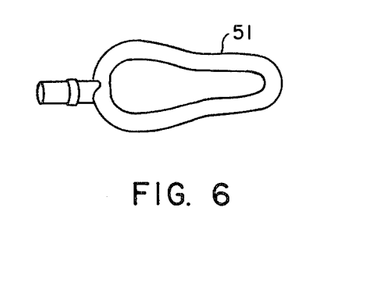
FIG. 6 is a perspective view of a feedwater ring for a steam generator.

The feedwater distribution ring 51 is cut from the feedwater nozzle 49 and removed. The cap 33 is cut from the wrapper 29 and removed along with the cylinder 37 and swirl vanes 38 as shown in FIGS. 4, 5 and 6.

Figures 7, 8:
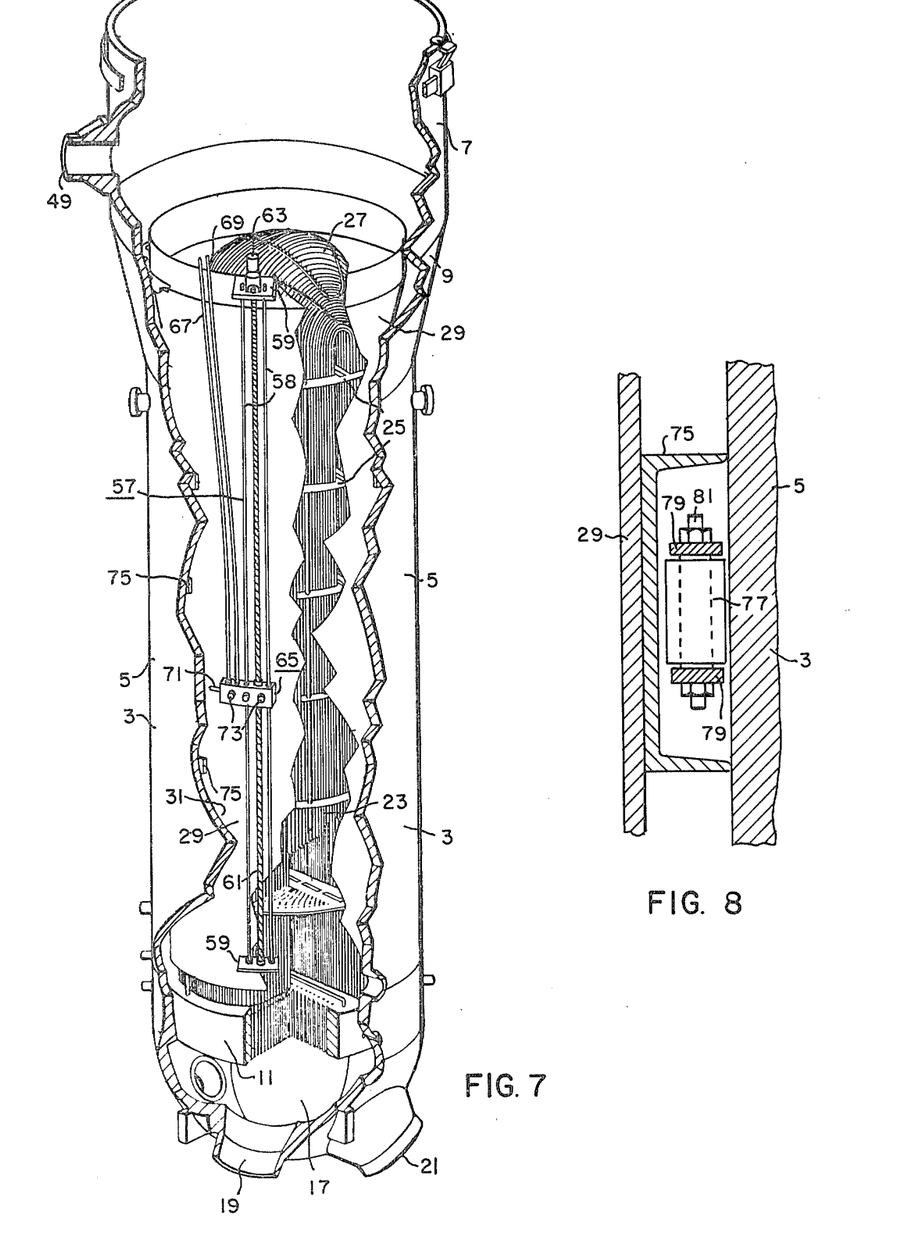
FIG. 7 is a perspective view partially in section of the lower portion of the steam generator showing a tool for cutting the wrapper supports.
FIG. 8 is a partial sectional view showing equipment for maintaining the annulus between the wrapper and the shell and for removing the tube bundle.

A cutting tool 57 is lowered into the annular space 31 between the wrapper 29 and the shell 3. The cutting tool 57 comprises a pair of elongated parallel bars 58 supported on each end by an arcuate-shaped plate 59 and a screw or threaded shaft 61, which is disposed between the bars 58 and parallel thereto. The screw 61 is rotatably connected to the plates 59 and a drive motor 63 is connected to the screw 61 turning it in either direction. A torch assembly 65 is slidably disposed on the bars 58 and has an internally threaded portion (not shown), which engages the screw 61, whereby the torch assembly 65 may be moved lengthwise or up and down along the bars 58 as the drive motor 63 is energized. Oxygen and acetylene hoses 67 and 69, respectively, are connected to a torch nozzle 71, which is disposed on one side of the torch assembly 65. Rollers 73, preferably ball rollers, are disposed on opposite sides of the torch assembly 65 to contact the shell 3 or wrapper 29 as the torch assembly 65 is moved upwardly or downwardly. An oxygen rich flame is utilized to cut pads 75, which space the wrapper 29 from the shell. The pads 75 are generally channels having legs which extend from the wrapper 29 to the shell 3 and are generally aligned vertically and can be cut by moving the torch assembly 65 in an upward or downward direction.

To maintain the annular space between the wrapper 29 and the shell 3 a plurality of rollers 77 are disposed between parallel flat bars 79. The rollers are rotatably disposed on a shaft 81, which also serves as a spacer for maintaining the bars 79 in a spaced relationship. The rollers are generally positioned adjacent a pad 75, in order to maintain the spacing between the wrapper 29 and the shell 3 as the pads 75 are cut by the torch assembly 65.

Large holes or openings 85 are cut in the shell 3 adjacent and above the tube sheet 11. The openings 85 are generally disposed on opposite sides of the shell 3 adjacent the tube lane, or opening formed between the legs of the short radius tubes 13. While this is a preferred location, a single opening could be provided anywhere above and adjacent the tube sheet 11 so long as there is free access to the outside of the shell 3 adjacent the opening 85.

Each opening 85 is sealed sufficiently to allow a negative pressure to be maintained within the shell. Fans or blowers 86 are disposed at various locations to maintain the negative pressure within the shell 3. The blowers discharge into a particle separation and collection system (not shown).

As shown in FIGS. 12 and 13, one of the openings 85 is closed by a lead cylinder 87 and a lead glass cover plate 89. The cover plate 89 has openings for a lighting and television camera assembly 91. A glove box 93 is also disposed in the cover plate 89.

FIG. 12 shows plasma torches 94 being inserted in one of the openings 85 for cutting the tubes 13 in two places. Once adjacent the tube sheet 11 and a second cut further away from the tube sheet 11 removing a short segment from each tube in order to provide access for cutting the remaining tubes 13 of the tube bundle 23.

FIG. 13 shows a pair of abrasive cutting tools 95 disposed on an articulated arm 97. The abrasive cutting tools 95 have rotatable abrasive disc 99, which are generally disposed in spaced apart, parallel planes, which are generally perpendicular to the tubes 13.

A chute or conduit 103, preferably shielded or made of lead, is disposed in communication with the lead cylinder 87 and is connected to a tube disposal tank 105. Segments of the tubes 13 severed by the abrasive cutting tool 95 or plasma torches 94 are removed from the shell 3 by dropping them down the chute 103 and into the disposal tank 105.

Figure 9:
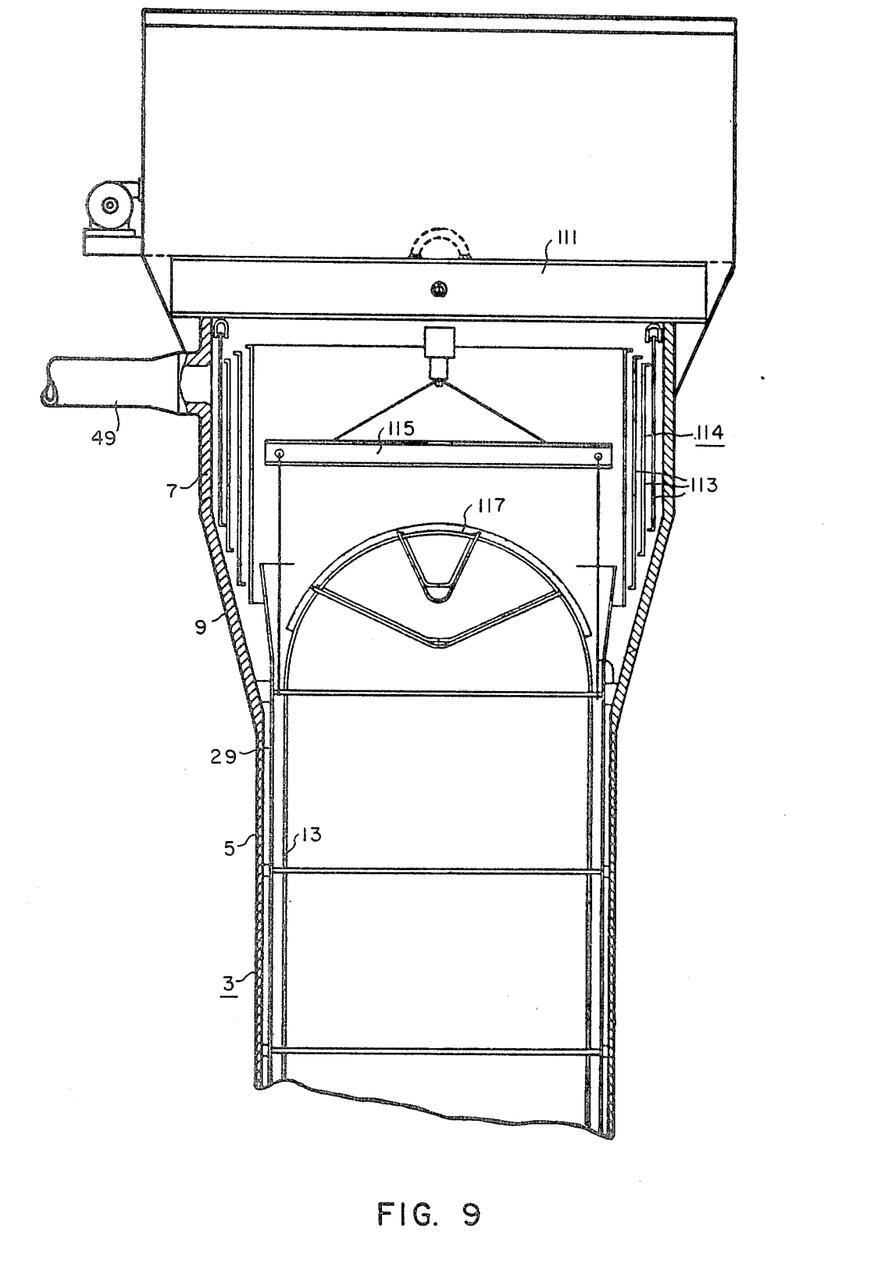
FIG. 9 is a partial sectional view of a top closure for the bottom portion of the steam generator with a tube bundle support or telescoping shield, which is utilized when the tube bundle is being removed from the shell.

Once the tubes 13 and pads 75 are cut, the tube bundle 23 and wrapper 29 can be removed utilizing the arrangement shown in FIG. 9, which incorporates a beam 111, a telescoping wall portion 113, which forms a shield 114 around the tube bundle 23 and wrapper 29 as they are lifted from the lower portion 5 of the shell 3. A spreader bar 115 and/or other suitable rigging is utilized to attach the tube bundle 23 and wrapper 29 to the beam 111. A lead blanket 117 is disposed over the upper end of the tube bundle to reduce the radiation from the upper end of the shield 114 as the tube bundle 23 and wrapper 29 are being removed from the shell 3.

Figure 10:
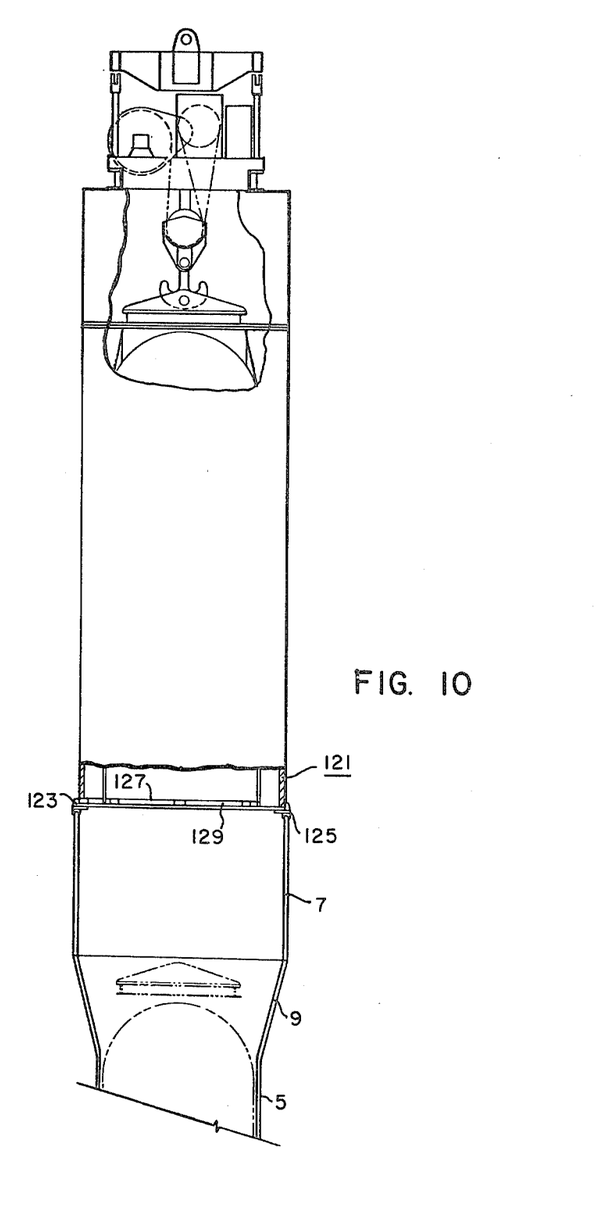
FIG. 10 is a partial sectional view of a modified top closure of the bottom portion of the steam generator showing the tube bundle being removed from the lower portion of the shell.

FIGS. 10 and 11 show an alternate radiation shield or cask 121, which is disposed on the upper end of the lower portion of the shell 3 for receiving the tube bundle 23 and wrapper 27 as they are removed from the shell 3. The cask 21 comprises a base portion 23, which rests on the newly cut upper edge of the lower portion of the shell 3. A circumferential sealing ring or other sealing means 125 is disposed between the base portion 123 and the newly cut edge of the lower portion of the shell 3 to form a generally air-tight seal therebetween and to protect the newly cut edge from damage as the cask 121 is being lowered into place. The base 123 also has a slot 127 disposed therein for receiving a bottom plate 129, which fits into the slot 127 and encloses the botttom portion of the cask 121.

The cask 121 is formed from heavy wall cylindrical segments which are joined end-to-end to produce the elongated cylindrical cask 121. The ends are rigidly connected by welding or other means to form a rigid structure and a generally air-tight seal is formed at the juncture of the segments. The juncture of the segments must be sufficiently rigid so that the cask 121 can be handled as a unit, when it is placed on top of the lower portion of the shell 3 and is removed with the tube bundle 23 and wrapper 29 disposed therein.

On top of the cask 121 and cooperatively associated therewith is a hoist assembly 131 which comprises a windlass 133, block 135, tackle 137, hooks 139, spreader bar 141 or other rigging or hoisting means for lifting the tube bundle 23 and wrapper 29 from the shell 3 and into the cask 121.

When the tube bundle 23 and wrapper 29 are in the cask 121, the bottom plate 129 is slid into place and the cask 121, tube bundle 23, and wrapper 29 are removed from the lower portion of the shell 3. After the tube bundle 23, wrapper 29 and cask 121 have been removed from the lower portion of the shell, the wrapper 29 and tube bundle 23 are cut into three pieces and these pieces are enclosed in three segments of the cask 121 by adding top or bottom or both top and bottom closure plates to the segments of the cask 121.

The tube sheet 11 and inner side of the shell are decontaminated and cleaned.

The tube-to-tube sheet welds are cut away by the cutting tool 56 and commercially available tube pulling tools are utilized to pull the tubes 13 upwardly through the tube sheet 11 and these segments of tubes 13 are disposed of via the chute 103 and tube disposal tank 105.

The holes in the tube sheet 11 are cleaned, inspected, and repaired, if necessary. A new wrapper 29 is lowered into the lower portion of the shell 3 and positioned within the shell 3 and affixed thereto. Tube support sheets 25 are positioned within the wrapper and new tubes 13 are passed through the holes in the support sheets 25 and tube sheets 11. The tubes 13 are tack rolled into the holes in the tube sheet 11 as they are positioned therein and are then seal welded to the tube sheet 11. When the remaining tubes 13 are in place, the tubes are expanded into engagement with the full depth of the tube sheet by hydraulic expansion or other means.

The vibration bars 27 are slid in place and secured, the dome cap 33 is placed on the wrapper, as shown in FIG. 2, and welded in place. The feedwater ring 51 is then replaced. The upper portion of the shell is replaced and a circumferential weld is made. The weld is heat treated and inspected radiographically. The steam generator 1 is then buttoned up, that is, all manholes and openings are closed and hydrostatic test is performed to ensure integrity of the shell in order to comply with code requirements. Piping connections are made and the steam generator with new tubes is generally in an as-new condition and is ready for service.

The method hereinbefore described advantageously upgrades a steam generator to allow continued operation of the nuclear reactor and this repair and upgrading can be performed while the steam generator is vertically oriented in the containment vessel, which severely limits the access to the vessel, making the retubing operation completely different from the manufacturing process.

What is claimed is:

1. A method of retubing a shell and tube heat exchanger having a tube sheet with a plurality of holes disposed therein and having a plurality of tubes extending from one side of the tube sheet to form a tube bundle, said method comprising the steps of:
    providing a large opening in the shell adjacent the tube sheet to facilitate access to the tube bundle;
    cutting a short segment from the tubes adjacent the tube sheet;
    freeing the tube bundle from the tube sheet as a unit and leaving a stub tube in the tube sheet;
    separating the shell and removing a portion thereof;
    removing the freed tube bundle from the shell;
    removing the stub tubes from the tube sheet;
    installing new tubes in the holes in the tube sheet to form a new tube bundle; and
    reassembling the shell.

2. The method as set forth in claim 1, wherein the tubes are U-shaped and there is a lane formed by a row of tubes having the smallest radial band and the step of providing an opening in the shell includes providing the opening adjacent one end of said lane.

3. The method set forth in claim 2 and further comprising the step of providing a second opening adjacent the other end of the lane.

4. The method set forth in claim 3 and further comprising the step of removing the short segments cut from the tube bundle through one of the openings.

5. The method set forth in claim 4 and further comprising the steps of:
   providing a radiation shield which will accept the tube bundle as it is being removed from the shell and lifting the tube bundle into the radiation shield; and
   removing said shield and tube bundle from the heat exchanger.

6. The method set forth in claim 1 wherein the heat exchanger has a wrapper with a dome disposed between the tube bundle and the shell and further comprising the steps of:
   providing an opening in the wrapper adjacent the opening in the shell;
   removing the dome from the wrapper;
   freeing the wrapper from the shell; and
   removing the wrapper with the tube bundle.

7. The method as set forth in claim 6 and further comprising the steps of:
   installing a wrapper in the shell; and
   replacing the dome on the wrapper after a new tube bundle has been installed.

8. The method set forth in claim 6 and further comprising the steps of:
   providing a radiation shield which will accept the tube bundle and wrapper;
   lifting the tube bundle and wrapper into the radiation shield; and
   removing the radiation shield tube bundle and wrapper from the heat exchanger.

9. The method as set forth in claim 1, wherein the step of cutting a short segment from the tubes includes severing the tube twice, adjacent the tube sheet and a short distance therefrom, whereby the tube bundle can be freed from the tube sheet and removed as a unit.

10. The method as set forth in claim 1 and further comprising the step of providing a negative pressure within the shell so that radioactive particles from the various operations do not leave the shell.

* * * * *